United States Patent [19]

Kawashima et al.

[11] Patent Number: 5,616,910
[45] Date of Patent: Apr. 1, 1997

[54] OPTICAL READING APPARATUS

[75] Inventors: Takashi Kawashima; Akira Tamagawa; Akira Osanai, all of Hachioji, Japan

[73] Assignee: Olympus Optical Co., Ltd., Tokyo, Japan

[21] Appl. No.: 422,271

[22] Filed: Apr. 11, 1995

[30] Foreign Application Priority Data

Apr. 14, 1994 [JP] Japan ................................. 6-076041

[51] Int. Cl.⁶ .................................................. G06K 13/00
[52] U.S. Cl. ............................................ 235/479; 235/480
[58] Field of Search ..................................... 235/479, 480

[56] References Cited

U.S. PATENT DOCUMENTS

| | | | |
|---|---|---|---|
| 3,896,293 | 7/1975 | Pass | 235/480 |
| 4,048,476 | 9/1977 | Lawter et al. | 235/479 |
| 4,443,693 | 4/1984 | Berezowski | 235/479 |
| 5,332,891 | 7/1994 | Togawa | 235/479 |

FOREIGN PATENT DOCUMENTS 58-123165  7/1983  Japan .

*Primary Examiner*—Harold Pitts
*Attorney, Agent, or Firm*—Frishauf, Holtz, Goodman, Langer & Chick

[57] ABSTRACT

An optical reading apparatus for a card medium having an optical signal in bar code form written thereon. The optical reading apparatus includes a receiving section for receiving cassette holding the card medium, and a light source for projecting a light beam spot on the optical signal written on the card medium. A reader reads the optical signal by moving the light beam spot in a scanning direction along the optical signal to scan the optical signal, and a guiding device moves the cassette in a direction substantially normal to the scanning direction, as the card medium held in the cassette is inserted into the receiving section. The optical signal written on the card medium is optically read while the cassette is being moved by the guiding device.

4 Claims, 4 Drawing Sheets

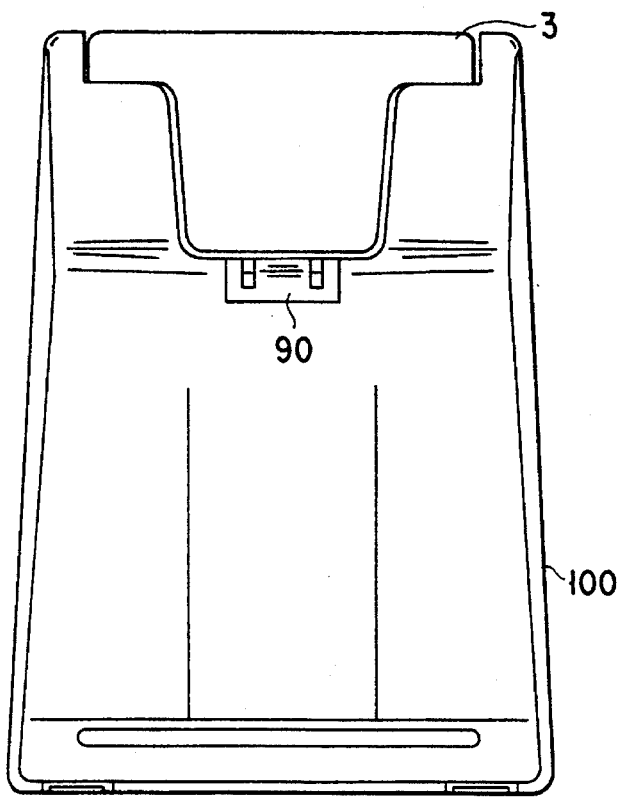
F I G. 1
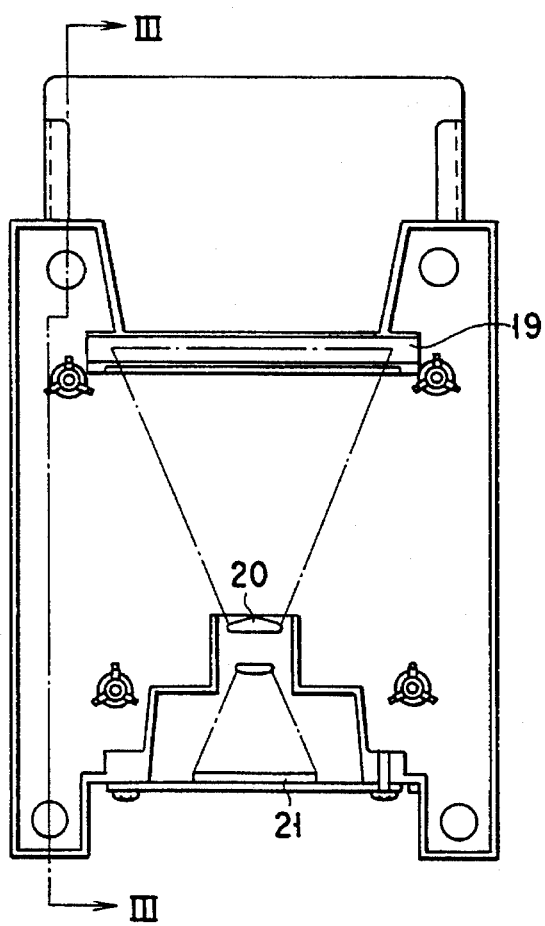
F I G. 2

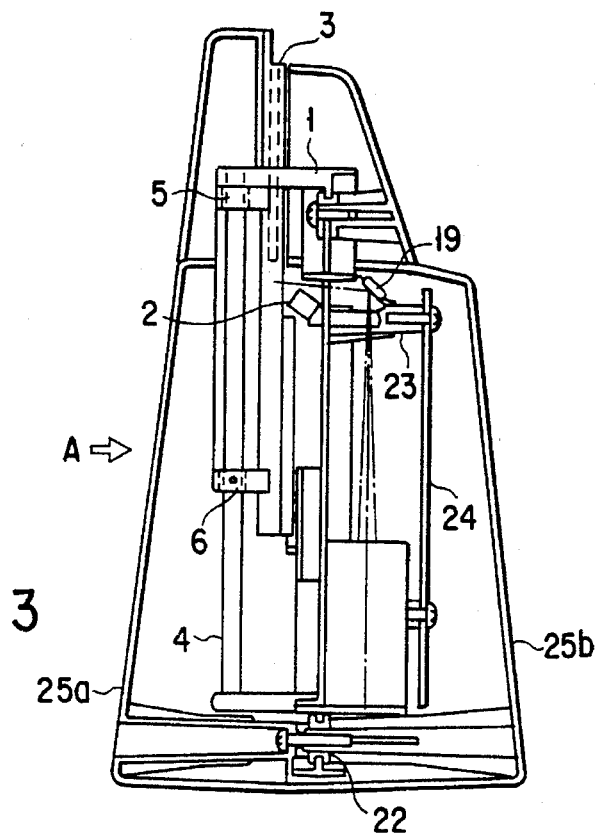
F I G. 3
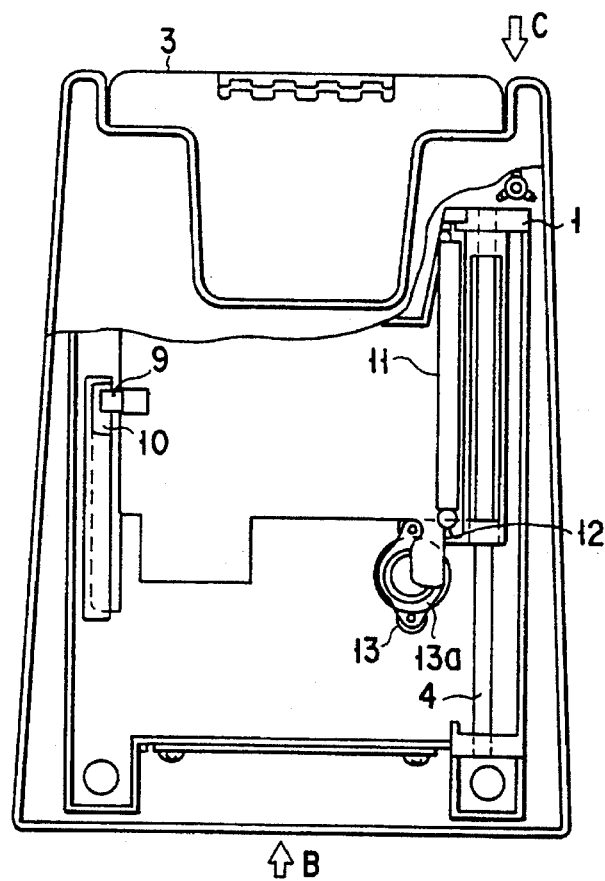
F I G. 4

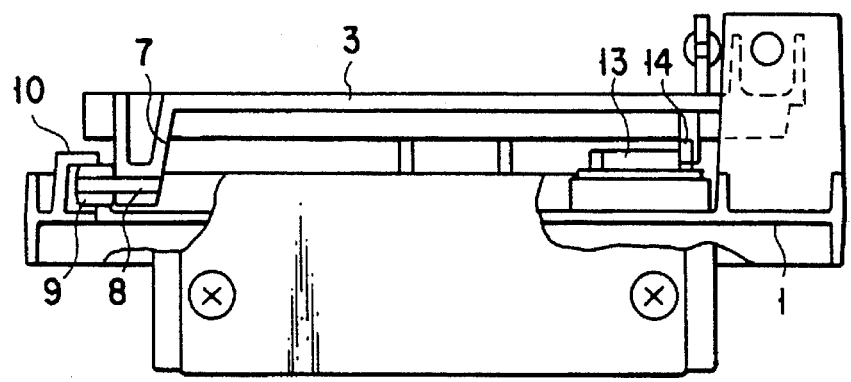
FIG. 5
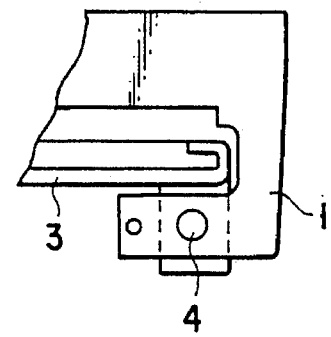
FIG. 6
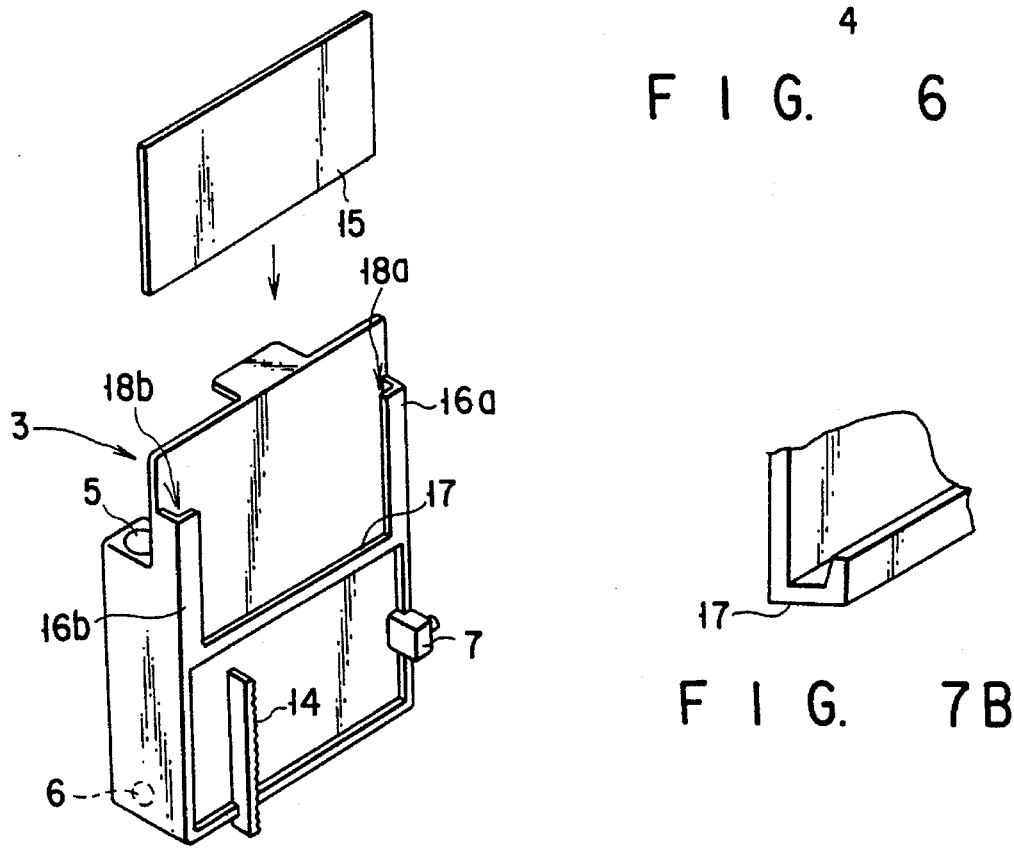
FIG. 7A
FIG. 7B

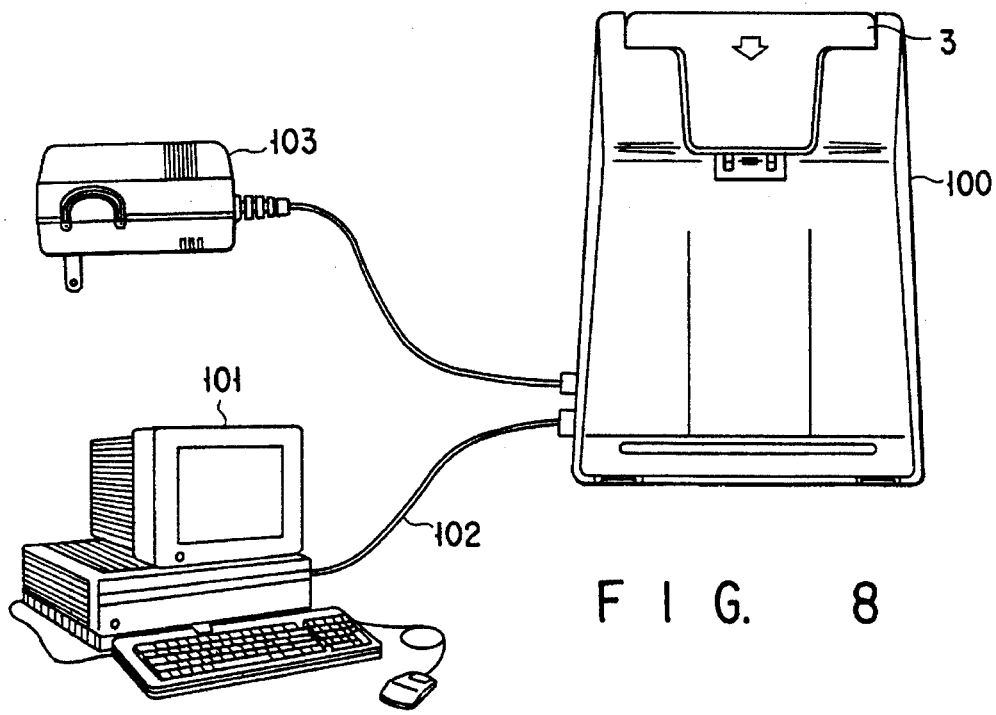
FIG. 8
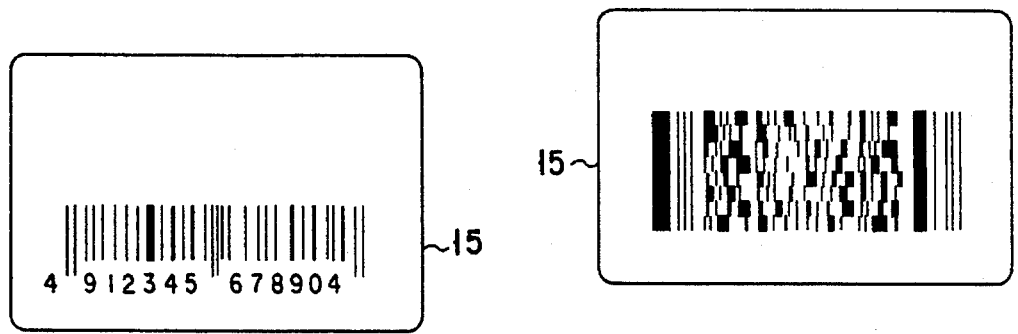
FIG. 9A
FIG. 9B
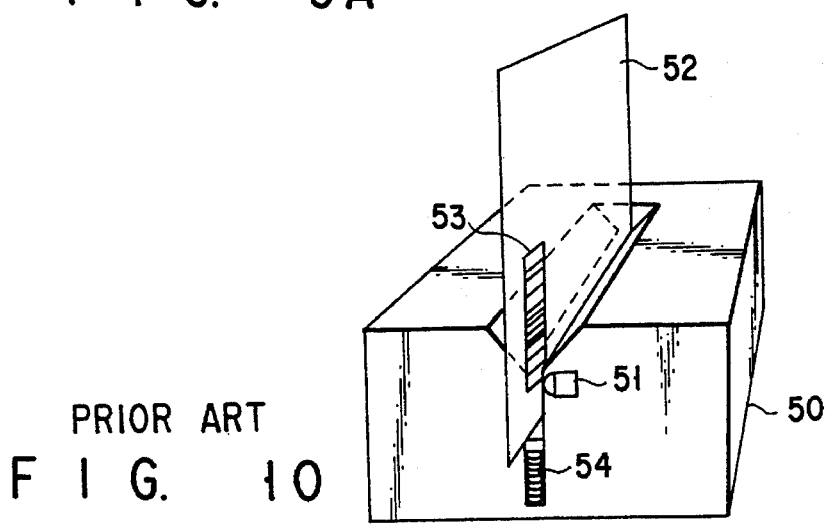
PRIOR ART
FIG. 10

5,616,910

OPTICAL READING APPARATUS

BACKGROUND OF THE INVENTION

1. Field of the Invention

The present invention relates to an optical reading apparatus, more specifically, to an optical reading apparatus suitable for easily reading data recorded on a card medium.

2. Description of the Related Art

As disclosed in, for example, Jap. Pat. Appln. KOKAI Publication No. 58-123165, a data reading apparatus with which a card medium is manually handled, is conventionally known.

This conventional data reading apparatus is an install-type card reading apparatus for reading bar-code data from a bar code written on a card.

FIG. 10 shows an appearance of such a conventional data reading apparatus.

This data reading apparatus includes a box 50, in which a light generation/detection device 51 and a spring 54 are provided.

In the box 50, a groove is formed by cutting into the box. A card 52, on which a bar code 53 is written, is inserted into the groove, and bar-code data is read from the bar code 53 as the card is inserted to the groove, or when the card is pushed back by the spring 54.

Recently, data cards have become popular as a data recording medium, and there is a great demand for reducing the production cost of a card medium itself.

Therefore, the use of a card medium formed by printing data on a piece of inexpensive paper or soft card medium, is getting more popular.

However, if such an inexpensive paper-made card medium, or a so-called soft card medium, is manually inserted in the conventional reading apparatus so as to read data of the medium, the card medium is likely to be bent, making it difficult to insert it again, or folded due to the repulsing force of the spring provided in the apparatus. In such a case, it may become impossible to read the data from the card medium.

Furthermore, while inserting the card medium, even if the card medium is carefully pushed with fingers, the card medium may stick to the fingers when the user tries to take his or her fingers away from the card medium, possibly causing a data reading error. The above-described problem may prominently occur especially when a thin-paper-made card medium is used.

Thus, when data is read out from a data card in which, for example, a two-dimensional bar code is written, reading errors may easily occur depending upon the manner by which the card is inserted.

On the other hand, phone cards used for public telephones or the like, or cards for cash dispensers are usually automatically loaded to or unloaded from those machines by the driving force of the motor.

However, in this case, a complicated driving system must be provided, thus increasing the production cost and the amount of power consumption.

SUMMARY OF THE INVENTION

The present invention has been proposed in order to solve the above-described problems and the object thereof is to provide a low-cost optical reading apparatus having such a simple structure that, any type of card media from a thin-paper-type card medium to a thick card medium can be smoothly and accurately inserted into the apparatus with a hand or fingers.

In order to achieve the above-described object, the present invention has a construction in which a card medium is loaded in a cassette, and then the cassette containing the card medium is inserted in the apparatus, so as to read an optical reference symbol such as bar code.

According to the present invention, as long as the card medium which can be loaded in the cassette, any type of card medium from a thin-paper card medium to a thick card medium can be used, and the bending, folding or the like of a soft card medium which is made of thin paper, in particular, can be prevented; therefore there can be provided an optical reading apparatus capable of accurately reading data recorded on a card medium.

BRIEF DESCRIPTION OF THE DRAWINGS

FIG. 1 is a front view of an optical data reading apparatus according to in embodiment of the present invention;

FIG. 2 is a plan view showing the apparatus shown in FIG. 1 in the state that the cover is removed;

FIG. 3 is a vertical cross section taken along the line III—III of FIG. 2;

FIG. 4 is a partial cross section of the apparatus taken from the direction indicated by arrow A in FIG. 3;

FIG. 5 is a lateral view of the apparatus without the cover, taken from the direction indicated by arrow B;

FIG. 6 is a plan view briefly showing the structure of a portion for connecting a chassis and a cassette to each other;

FIG. 7A is a perspective view of the cassette;

FIG. 7B is a partial perspective view briefly showing the state in which a step portion is formed on a cassette stopper surface;

FIG. 8 is a perspective view briefly showing the structure of a reading system in which the present invention is applied;

FIG. 9A is a plan view showing the structure of a data card on which a bar code symbol is written;

FIG. 9B is a plan view showing the structure of another data card on which a bar code symbol is written;

FIG. 10 is a perspective view briefly showing the structure of a conventional card reading apparatus.

DETAILED DESCRIPTION OF THE PREFERRED EMBODIMENTS

The optical reading apparatus according to an embodiment of the present invention will now be described in detail with reference accompanying drawings.

As shown in FIG. 1, the optical reading apparatus of this embodiment includes a main body 100, a cassette 3 for storing a card medium and a display 90.

The display 90 is designed to display a power supply, decode and the completion of decode.

FIG. 2 shows the main body 100 shown in FIG. 1, from which the cover has been removed, and FIG. 3 shows the structure in cross section taken along the line III—III of FIG. 2. FIG. 4 shows a partial structure in cross section viewed from the direction indicated by arrow A in FIG. 3, and FIG. 5 shows a lateral structure without the cover, viewed from the direction indicated by arrow B in FIG. 4. FIG. 6 shows a structure used for connecting the chassis 1 and the cassette 3 to each other. FIG. 7A illustrates the manner by which a card 15 is inserted into the cassette 3, and FIG. 7B illustrates the step portion formed on the stopper surface 17.

As shown in FIG. 3, on the left-hand side of the chassis 1, a lighting device 2 in which a plurality of light emitting elements (LED) are held, and a mechanism which moves the cassette 3 up and down, are provided.

In this mechanism, a shaft 4 for guiding one side of the cassette 3 in the up and down direction, is fixed between the sections protruding as arms from the upper and lower sections of the chassis 1. The shaft 4 is engaged with two bearings 5 and 6 provided on the cassette 3.

Furthermore, in the mechanism, a roller shaft 8 for guiding the other side of the cassette 3, as shown in FIG. 5, is fixed to a protrusion portion 7 of the cassette 3, and is set into a roller 9.

This roller 9 is rotatably provided in a roller guiding portion 10 of the chassis 1.

In the version shown in FIG. 5, an inexpensive roller 9 is used as one guide; however it is preferable that both guides are made of the shaft 4 and the bearings 5 and 6.

Furthermore, as shown in FIG. 4, an extension spring 11 is provided as a return mechanism for the cassette 3. An end of the extension spring 11 is fixed to the upper end of the chassis 1 and the other end is fixed to a spring hook 12 provided in the lower portion of the cassette 3.

The returning speed of the cassette 3 can be adjusted by changing the tension of the extension spring 11; however, with use of a so-called high tension spring to which a tensile force is initially applied when there is no load, the change in speed can be narrowed while the size of the device is reduced.

In the optical reading apparatus of the present embodiment, a rotary damper 13 is provided for suppressing the returning speed at low and achieving a constant speed.

The rotary damper 13 can be prepared so as to exhibit a suppressing force in one direction and both directions. A rotary damper filled with oil or grease is known as a typical example of such a damper.

The combination of the rotary damper 13 and the extension spring 11 exhibits a synergetic effect, which can maintain the speed constant in one direction or both directions.

For example, in order to achieve the structure in which the moving speed is increased in the cassette inserting direction and the moving speed is made constant in the returning direction, a one-directional rotary damper should be used. In order to achieve the structure in which the moving speed is made constant in both the inserting and returning direction, a bi-directional rotary damper should be used.

As shown in FIG. 4, in this embodiment, the rotary damper 13 is fixed to the chassis 1, and as a rack 14 formed in the cassette 3 and a gear portion 13a of the rotary damper 13 are engaged with each other, the returning speed is made constant.

With the above-described structure, the cassette 3 is inserted into the device by pushing the upper portion of the cassette with hand or fingers, and when it returns, the cassette receives the acting forces from the extension spring 11 and the rotary damper 13. Consequently, the cassette 3 is returned at a stable returning speed which does not vary much.

In the present embodiment, the extension spring 11 is used; however, a compression spring, for example, can be used in place of the extension spring 11.

As shown in FIG. 7A, the data card 15 marked with, for example, a bar code, is dropped in guide portions 16a and 16b provided on both ends of the cassette 3, and the card is stopped by an stopper surface 17.

The stopper surface 17 may be of a flat-shape; however if it is made to have a stepped shape as shown in FIG. 7B, insertion errors, for example, the data card 15 dropping in the device, can be prevented while straightening the data card which may be very much warped.

As shown in FIG. 7A, gaps 18a and 18b formed in the guide portions 16a and 16b of the cassette 3, are designed to determine the range of the focal point depth of the reading optical system.

The reason for forming the guide portions 16a and 16b at one-step lower level in the upper portion of the cassette 3, is to simplify the card inserting operation by pressing the data card 15 once on the guide-absent portion.

Furthermore, as shown in FIG. 3, a reader portion is provided in the chassis 1 on the right-hand side in the figure. A plurality of light-emitting diodes are arranged in the lighting device 2 in the direction of reader lines (scanning lines) of the bar code. A reflection light from the data card 15 lightened by the lighting device 2 is reflected by a mirror 19 shown in FIG. 2, and then is projected on a line sensor 21 via a lens 20 of the image forming device. Upon the projection, the line sensor 21 generates an electrical signal which corresponds to the tone of the reflection light received.

The above-described image forming device and the above method of processing an electrical signal are conventionally wide-known and practiced. In the case of this embodiment, as shown in FIG. 3, the processing of a signal is carried out by a signal processing substrate 24 mounted on a plurality of bosses 23 protruding from the chassis 1.

Furthermore, in this embodiment, the above-described driving mechanism for the cassette 3, the reader portion and the signal processing substrate are all assembled on the chassis 1. A hole is made at a plurality of sections in the chassis 1, and an insulator (drop shock absorber) 22 is plugged into each hole.

Furthermore, as shown in FIG. 3, covers 25a and 25b are fixed so that the insulators 22 are interposed therebetween, so as to protect the internal structure in case of shock when dropped.

In this embodiment, the cassette 3 is formed so as to be operated in the vertical direction (the direction normal to the read scanning direction); however it is also preferable that the cassette 3 be formed so as to be operated in, for example, the horizontal direction or a diagonal direction. This is because one side of the data card 15 is brought into tight contact with the card receiving surface of the cassette 3 at all times, thus making it possible to obtain a stability in holding the data card 15. Especially, in the case where the data medium surface is used as the card receiving surface (holding surface), the optical system is stabilized in a constant state at all times without being influenced by the thickness of the data card 15, achieving a higher stability in reading.

As described, according to this embodiment, a card-like medium such as the data card 15 marked with a bar code is first housed in the cassette 3 and then the cassette 3 is inserted into the optical reading apparatus. With this structure, there can be provided a low-cost optical reading apparatus having such a simple structure that, any type of card media from a thin-paper-type card medium to a thick card medium can be smoothly and accurately inserted into the apparatus with a hand or fingers. Consequently, the bar code data can be accurately read without damaging, i.e. bending or folding a card medium, even in the case where a so-called soft card medium including thin-paper card, is used.

FIG. 8 shows the structure of a reading system in which the aforementioned optical reading apparatus 100 is connected to a host computer 101.

Examples of the data cards used in such a reading system are a data card 15 shown in FIG. 9A and a data card 15 shown in FIG. 9B.

The operation of this reading system will now be described with reference to FIGS. 8, 9A and 9B.

First, the data card 15 is set into the cassette 3 by the operator, and the cassette 3 thus holding the data card 15 is pushed into the optical reading apparatus 100. Thus, the bar code reading is carried out on the data card 15.

When the data card 15-contained cassette 3 is pushed into a predetermined position of the optical reading apparatus 100, a stopper (not shown) stops the cassette 3 so that it cannot be further pushed in. After the reading of data, the cassette is pushed back up by a spring (not shown).

During the above operation, the bar code reading with regard to the data card 15 is completed.

It should be noted that the bar code reading operation may be carried out not when the cassette 3 is pushed into the device but when it is pushed back up. Further, in the case where the bar code is of high-density data such as two-dimensional bar code, the first reading may be carried out when the cassette is pushed into, and the second reading may be carried out when it is pushed back up.

Next, the bar code data read from the data card 15 is transmitted via a connection cable 102 to the host computer 101, where various types of data processing are carried out.

As a communication interface, a variety of types of interface, such as RS-232C interface, can be applied. For example, it is possible to provide a communication control circuit on the above signal processing substrate 24, or to provide a communication control circuit on another substrate.

The reading system shown in FIG. 8 has a structure by which the system and the computer are connected to each other via the connection cable 102. However, when the host computer 101 and the optical reading apparatus 100 are located far from each other, a wireless modem (not shown) or the like may be provided in place of the connection cable 102, so as to achieve the communication between the host computer 101 and the optical reading apparatus 100.

In the case where the data is transmitted to a distant place, a portable digital terminal, or a communication line such as an optical communication line including an optical fiber cable, an ISDN line, a public telephone line may be used.

In the above embodiment, a line sensor is used as the reading portion; however a small-sized laser module may be used to read a one-dimensional or two-dimensional bar code.

In the above reading system, the power supply to the optical reading apparatus 100 is carried out via an AC adaptor 103; however, with use of an optical reading apparatus 100 equipped with a power source, the optical reading apparatus 100 can be realized without using the AC adaptor 103.

As described above, in this embodiment, data is optically read out from the data card 15 while it is set in the cassette 3. Therefore, if a thin-paper card medium is used as the data card 15, the damage to the data card 15 caused by bending or folding it, can be prevented.

Furthermore, in this embodiment, the mechanism for moving the cassette 3 up and down, is made to include a shaft 4 (see FIG. 3) for guiding one side of the cassette 3 in the up and down direction and a roller shaft 8 (see FIG. 5) for guiding the other side of the cassette 3, and to have a structure in which the cassette 3 is moved back and forth by an extension spring 11 (see FIG. 4), thus simplifying the structure of the optical reading apparatus.

Moreover, according to this embodiment, the data card 15 is conveyed while being set in the cassette 3, and therefore the card can be conveyed stably and accurately as compared to the conventional optical reading apparatus, thus enabling a precise reading operation. Especially, in the case where bar code data is read out from the data card 15 marked with a two-dimensional bar code, very high reading accuracy can be maintained.

What is claimed is:

1. An optical reading apparatus for a card medium having an optical signal in bar code form written thereon, the optical reading apparatus comprising:

receiving section which receives a cassette holding said card medium;

a light source for projecting a light beam spot on said optical signal written on said card medium;

reading means for reading said optical signal by moving said light beam spot in a scanning direction along said optical signal or said card medium to scan said optical signal; and guiding means for moving said cassette in a direction substantially normal to said scanning direction, as said card medium held in said cassette is inserted into said receiving section;

wherein said optical signal written on said card medium is optically read while said cassette is being moved by said guiding means.

2. An optical reading apparatus according to claim 1, wherein:

said light source and said reading means are fixed in said optical reading apparatus; and said guiding means includes means for moving said cassette so that at least said optical signal written on said card medium is scanned by said reading means.

3. An optical reading apparatus according to claim 1, wherein said optical signal written on said card medium comprises one of a one-dimensional bar code signal and a two-dimensional bar code signal.

4. An optical reading apparatus according to claim 1, wherein said guiding means includes a rotary damper and a spring member which together regulate a moving speed of said cassette in at least one direction of movement thereof, such that said moving speed is constant.

* * * * *